Sept. 11, 1956  M. P. SWEENEY  2,762,449
CONDENSING METHOD AND APPARATUS
Filed Aug. 11, 1953  2 Sheets-Sheet 1
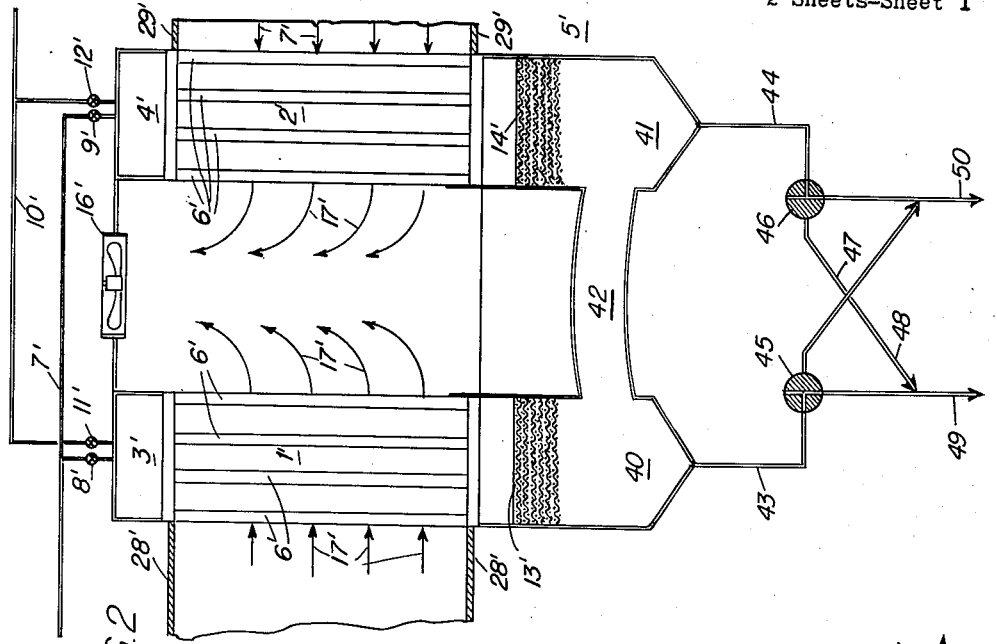
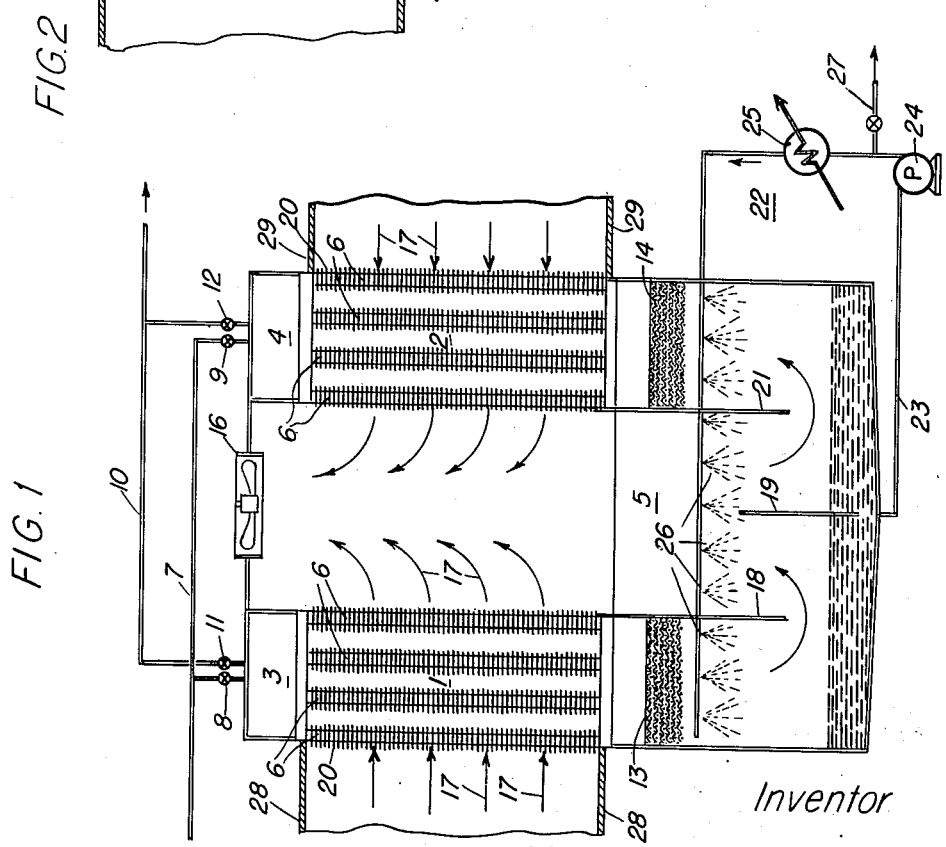
Inventor
Maxwell Patrick Sweeney
By his attorneys
Howson and Howson.

Sept. 11, 1956 M. P. SWEENEY 2,762,449
CONDENSING METHOD AND APPARATUS
Filed Aug. 11, 1953 2 Sheets—Sheet 2

Inventor
Maxwell Patrick Sweeney
By his attorneys
Howson and Howson.

2,762,449
Patented Sept. 11, 1956

United States Patent Office

2,762,449
CONDENSING METHOD AND APPARATUS

Maxwell Patrick Sweeney, Glenolden, Pa., assignor to United Engineers & Constructors Inc., Philadelphia, Pa., a corporation of Delaware Application August 11, 1953, Serial No. 373,643

12 Claims. (Cl. 183—2)

This invention relates to a method and apparatus for recovering a condensible component from gaseous mixture, and more particularly, to a method and apparatus for recovering a condensible component from a gaseous mixture where the degree of recovery required and the nature of the system involved are such that the condensing temperature of the component enters a temperature region where the component condenses directly as a solid, without passing through a liquid phase.

The invention is particularly applicable to the recovery of phthalic or maleic anhydride from a hot gaseous mixture of reaction products resulting from the catalytic oxidation of naphthalene or benzene.

The type of problem which the present invention overcomes may best be grasped from a consideration of the present manner of making phthalic anhydride, although it will be understood that the invention is not limited to the production of phthalic anhydride.

Phthalic anhydride is at present produced by oxidizing naphthalene in the presence of a catalyst to give a gaseous mixture comprising nitrogen, water, phthalic anhydride, and various hydrocarbons. Details of the oxidation process vary and are not a part of the present invention.

In one method for recovering the phthalic anhydride, the gaseous reaction products are run into a large enclosure, or barn, where they stand under atmospheric temperature until the anhydride product crystallizes on the walls and floor. Workers are then sent in to chip off the incrustations. This is an extremely disagreeable and unhealthy task and is expensive and inefficient in many ways.

In a second method, the gaseous reaction products are contracted with an aqueous slurry of phthalic acid and the anhydride is absorbed as acid. A portion of the slurry is continuously withdrawn from the stream and heated to dehydrate it to the anhydride. This method requires large amounts of expensive stainless steel equipment and involves a considerable problem in the disposal of fumes from the dehydrator.

In a third method, the hot gases are moved in a zigzag path through a condenser having tubes carrying cooling water. The solid anhydride collects on the outside of the tubes. After a time, the gases are diverted to a second condenser, and steam is run through the tubes of the first condenser, melting the product and permitting it to be removed as a liquid. This last method is handicapped by the size of the equipment required and the complexity of the operational sequence. It has been pointed out that some 18 separate operations are required for each condenser, at least two condensers being required in all, whose cycles must be intermeshed. This complexity demands either constant attention by skilled labor, or the installation and maintenance of costly automatic equipment.

Moreover, where water or other liquid is used as the cooling medium, it is very difficult to control the temperature of the condensing surface in any prescribed relationship with the gas temperature. The temperature of the tube wall surface, because of the different order of magnitude of the heat transfer coefficient in the liquid film as compared with the gas film, will be either too high or too low. If the condenser is operated to make a maximum recovery of anyhdride, the temperature of the condensing surface will be such that all of the anhydride will condense as a solid, thus requiring additional means for melting solid; whereas, if the tube wall temperature is maintained at a level sufficiently high to condense anhydride aas a liquid, inadequate recovery will result. Furthermore, in the case of phthalic anhydride, where tube wall temperatures are low, care must be exercised that these temperatures be maintained above the water dew point of the gases to avoid the formation of phthalic acid, which is a contaminant as well as being difficult to remove from the condensing surface.

Moreover, where the hot gases are passed outside condenser tubes, as they must be, practically speaking, where a liquid coolant is employed, it is necessary to conduct them through several passes over the total length of the tube, in a zig-zag fashion. To confine the gases, it is necessary to enclose the tubes in a shell. The large size of apparatus of this general design, sets a practical limit on the overall size of any one condenser. In addition, the problem of controlling the temperature of the condensing surface is magnified when multiple passes are used.

The procedures described above and their drawbacks have been mentioned particularly in connection with phthalic anhydride recovery, for illustrative purposes, but they apply as well to the recovery of maleic anhydride, with the single exception that the use of "barn" condensers is not generally employed with maleic anhydride. They apply generally to processes where it is necessary, for economic or other reasons, to condense a portion of a substance from a gaseous mixture such that the condensing temperature of the substance enters a temperature region where the gaseous phase is in equilibrium with solid, and thus where, in order to get the recovery desired, it is necessary to condense at least some of the substance as a solid.

It is, accordingly, an object of the invention to provide a method and apparatus for recovering a condensible component from a gaseous mixture, under conditions in which the component passes through a solid phase, in which a pure product may be obtained with a minimum labor expenditure.

It is a further object of the invention to provide a condensing method and apparatus of the class described, in which a minimum of operating expense is incurred.

It is a further object of the invention to provide a condensing method and apparatus of the class described, in which a minimum of expensive equipment is necessary.

It is a further object of the invention to provide a condensing method and apparatus of the class described, in which the temperature under which condensation takes place may be carefully controlled.

It is another object of the invention to provide an improved method and apparatus for recovering as a liquid, phthalic or maleic anhydride, substantially uncontaminated with acid, from a stream of gaseous reaction products.

Other objects will appear from a consideration of the following specification and claims.

The above objects are obtained, according to the invention, by moving a gaseous mixture containing the desired product, past a condensing surface cooled by indirect contact with a gaseous coolant, and thereby condensing said component in the solid state; and subsequently melting said solid component from said condensing surface by additional gaseous mixture.

In carrying out the invention, a gaseous stream containing the desired substance passes by a first condensing surface initially coated with solid product from a previous cycle, so that solid product is melted from the condensing surface. It will therefore be seen that the temperature of the incoming gaseous stream is higher than the melting point of solid product. According to the invention, the gases are then moved past another condensing surface indirectly cooled by a gaseous coolant upon which additional product is condensed as a solid.

In the process according to the invention, after a suitable quantity of product has formed on the second cooling surface, the direction of flow of the gases through the system is reversed and the gases pass first into contact with the second cooling surface, melting solid product therefrom, and then into contact with the first surface, where solid product is condensed.

The invention includes a process as described in which the first condensing surface is cooled by a gaseous coolant and wherein product is condensed from the gases at the same time that solid product is melted from the condensing surface.

Generally, the condensing surfaces are provided by conduit means, preferably a group or set of vertical or inclined tubes or conduits, the gaseous stream being passed through the tubes so that product condenses on their interior surfaces. The cooling medium, preferably air, is moved on the outside of the tubes in a direction generally transverse thereto. The stream of coolant makes only a single pass through the bank of tubes and the entire length of each tube is contacted by the stream of coolant in that pass.

The invention may further include a step in which the gases moving from the first condensing surface, from which they have melted solid product, to the second condensing surface, are contacted with a spray of cooled liquid product, to condense additional product from said gases.

The invention further provides condensing apparatus comprising a first set of conduits, a second set of conduits, means connecting said first set of conduits with said second set, and means for moving a gaseous coolant in a single pass through said sets, external to said conduits and in a direction substantially transverse to the axes of said conduits. Advantageously, the conduits are installed on a triangular pitch, thus providing substantially uniform gas flow around each conduit.

To insure that the coolant moves in a direction substantially transverse to the axes of the conduits, apparatus according to the invention may comprise duct means arranged adjacent to said conduits, and at a point nearest said conduits, having a width substantially equal to the length of said conduits, whereby coolant issuing from said duct means may flow transversely past said conduits, contacting substantially the whole length of said conduits in a single pass.

The conduits of the novel condenser are preferably made of aluminum or some other similar material of low heat capacity to facilitate quick assumption of proper temperature as the direction of flow through the system is reversed. The conduits may have fins, if desired, or they may be smooth. The conduits are preferably mounted in a vertical or inclined position to permit condensed liquid or melted solid to run off the condensing surface.

The invention further comprises apparatus as described, and including spray means for contacting gases passing from one set of conduits to the other, whereby the gases may be further cooled by a spray of cool liquid product.

In the drawing:

Fig. 1 is a vertical sectional view, partly schematic, of condensing apparatus according to the invention in its preferred form, incorporating a spray chamber.

Fig. 2 is a vertical sectional view, partly schematic, of condensing apparatus according to the invention, without a spray chamber, and arranged to collect two separate fractions of a desired product.

Figure 3:
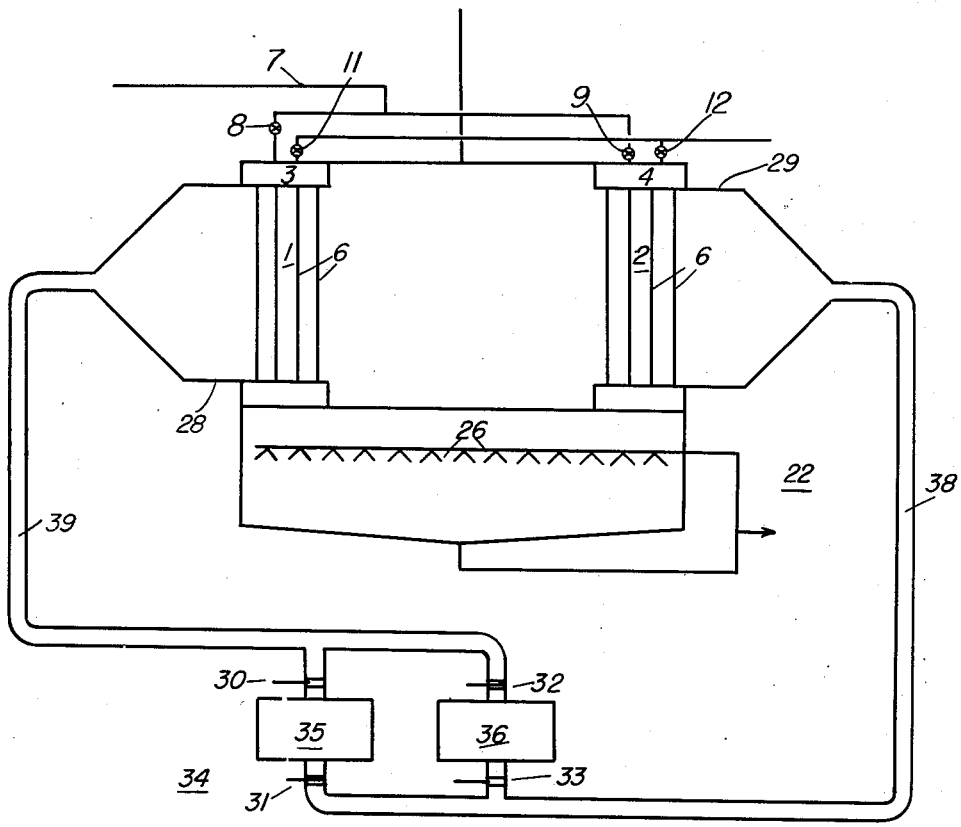
Fig. 3 is a schematic diagram showing an arrangement for furnishing coolant to the novel system.

Referring first to Fig. 1, the apparatus of the invention comprises two sets or nests 1 and 2 of tubes or conduits 6. The tubes are preferably vertical, as shown, and extend between headers 3 and 4 and a chamber 5, which serves to collect liquid product running down the walls of the tubes and also forms a connecting means between nests 1 and 2.

The tubes 6 are made of aluminum or some similar material having low heat capacity and may have fins 20. A line 7 is provided for introducing the gaseous mixture to be treated into either header 3 or header 4, and valves 8 and 9 are provided which make it possible to select the nest to which delivery is desired. A line 10, and suitable valves 11 and 12 are similarly provided to remove uncondensed gases from the apparatus.

The chamber 5 is provided with entrainment removal devices 13 and 14, such, for example, as mesh screening, to remove entrained liquid particles from the gases passing out of the chamber. Chamber 5 is preferably pitched slightly at the bottom.

The chamber 5 also has baffles 18, 19, and 21, and a spray system, indicated generally as 22, for contacting the gases flowing around baffles 18, 19, and 21 with liquid product. This spray system comprises a line 23 leading from the bottom of chamber 5, a pump 24, and a cooler 25, and a plurality of spray heads 26. A line 27 is connected to line 23 for drawing off liquid product.

The spray system as outlined provides flexibility in the operation of the apparatus, and is particularly valuable where it is desired to use cooling medium having the same temperature, and possibly the same flow rate, in both sides of the apparatus. It also gives a cushioning effect against variations in temperature, composition, and throughput of the stream entering the apparatus.

A fan or blower 16, is provided between the two tube nests 1 and 2 to draw air or other gaseous cooling medium from ducts 28 and 29 through the tube nests as shown by arrows 17, and discharge it to the atmosphere.

The origin of the cooling medium used in the apparatus is not a part of the invention, but the temperature and rate of flow of the coolant should be carefully controllable. In the flow diagram of Fig. 3, a schematic representation is made of a coolant system indicated generally as 34. It comprises a hot chamber 35 for furnishing coolant to the hot side of the condenser and a cold chamber 36 from which coolant may be directed to the cold side of the condenser. Valves 30, 31, 32, and 33, are arranged to permit coolant from either chamber to be directed to either side of the condenser, through lines 38 and 39 and ducts 28 and 29.

While two sources of coolant have been shown, and have been referred to as the "hot" source and the "cold" source, it will be understood that these terms are merely relative and that in fact coolant having the same temperature may be furnished to both sides of the condensing apparatus, in the same or in different quantities or rates.

As pointed out, the means for generating coolant is not a part of the invention, and various systems for generating a controlled stream of gaseous cooling medium may be employed.

It will further be understood that the depth of the tube nests 1 and 2, in the direction of coolant flow, may be varied and that although nests four rows deep have been shown, in practice, a single row of tubes, or many more than four, may be used. The number of rows will depend on the capacity required.

Similarly, the width of the tube bank transverse to the direction of coolant flow will vary between a comparatively narrow bank and a bank having many tubes.

The operation of the novel system may best be described with reference to Figs. 1 and 3. For purposes of illustration, it will be assumed the system is being used in connection with the recovery of maleic anhydride, it being understood that the operation is generally similar in the case of phthalic anhydride, or other similar substances.

At the beginning, the valves 8 and 12 are opened and valves 9 and 11 are closed. Similarly, valves 30 and 33 of the coolant system are opened and valves 31 and 32 are closed. Hot products of reaction from a converter (not shown) containing maleic anhydride, water, and inert components, are led through line 7, pass through valve 8, enter header 3, and thence flow through the tubes 6 of nest 1. Initially, when the apparatus is first put on stream, these tubes will be clean, i. e., they will not be coated on the inside with solid anhydride. After one cycle of operation, as will later appear, the tubes of nest 1 will have acquired an internal coating of solid product.

In either case, gaseous cooling medium, preferably air from hot chamber 35, is drawn by fan 16 through ducts 39 and 28 and thence through tube bank 1. The temperature and rate of flow of the air passing through tube nest 1 are controlled to condense a portion of the anhydride on the inside of the tubes as a liquid. If solid anhydride is coated on the interior of the tubes as it will be in all cases except when the anhydride apparatus is first put on stream, this is melted by the hot gases flowing through the tubes and falls with the portion condensed, into the chamber 5.

The semi-cooled gases from nest 1 pass downwardly through separator 13 into chamber 5. There, in the preferred embodiment of the invention, they are contacted with cooled liquid anhydride from sprays 26. As shown more clearly in Fig. 1, the anhydride emerging from sprays 26, is drawn from the bottom of chamber 5 by pump 24 and is cooled in cooler 25 to a point as close to its freezing point as practical, say to between about 54° C. and about 70° C., preferably to between about 55° C. and about 57° C. At this temperature, it is delivered to sprays 26 whence it emerges into chamber 5 to contact the hot gases emerging from the tubes 6 of nest 1. By this contact, the spray liquid further cools the gases and condenses, as a liquid, a further portion of their anhydride content which falls to the bottom of chamber 5.

After passing over baffles 18, 19, and 21, and meeting the sprays described above, the gases pass out of chamber 5 through entrainment separator 14, into the tubes of tube nest 2. Nest 2 is cooled by air drawn by fan 16 from cold chamber 36 through valve 33 and ducts 38 and 29. The rate of flow and the temperature of the air are controlled so that the temperature of the tube walls in nest 2 are, for the most part at least, below the freezing-condensation point of the anhydride, while the tube-wall temperature at the exist of nest 2 is above the water dew point of the gas.

In passing through nest 2, the gases are chilled and deposit solid anhydride on the internal surfaces of the tubes. They then pass out through header 4, valve 12, and line 10. After a suitable deposit of anhydride has built up on the interior of the tubes of nest 2, valves 8, 12, 30, and 33 are closed, and valves 9, 11, 31, and 32 are opened. The hot gases then move first into the tubes of nest 2, where they melt the solid anhydride previously deposited and have liquid anhydride condensed from them. Emerging from nest 2, the gases are subjected to sprays 26 in chamber 5 and then pass into nest 1, where they are cooled by air from chamber 36, passing through valve 32, and ducts 39 and 28, to deposit solid anhydride. When the coating of solid product on nest 1 is thick enough, the cycle is repeated.

Throughout the cycle, a continuous stream of liquid anhydride is withdrawn at line 27.

Although the invention has been described above in connection with a system in which liquid product is condensed from the gases as those gases melt solid product from a condensing surface, as suggested above in other embodiments of the invention, liquid condensation may be dispensed with, at least at this stage of the process. In such other embodiment, some product may be condensed as liquid by means of a spray such as has been described, or all the product may be condensed as a solid, and subsequently melted from the condensing surface in the manner described.

To illustrate these other embodiments, assume that hot gases containing, for example, phthalic anhydride, enter header 3 from line 7, through valve 8. They pass downwardly through tubes 6 of nest 1. The temperature of the hot gases from line 7 is made sufficiently high and the flow rate and temperature of the coolant passing outside the tubes of nest 1 is adjusted, so that although solid anhydride is melted from the tubes, substantially no liquid anhydride is condensed from the gases.

Emerging from the tubes of nest 1, the gases are met with cool liquid anhydride issuing from spray heads 26, whereby a proportion of the anhydride present in the gases is condensed as liquid. The gases then pass through entrainment separator 14 and into the tubes of nest 2 where anhydride is condensed as solid. The direction of flow is then reversed, melting solid from nest 2 and depositing it on the tubes of nest 1.

It will be obvious that in certain cases where liquid condensation in the first or "hot" tube nest is not desired, the coolant stream may be eliminated from that side of the apparatus. This mode of operation will be found useful where substances of especially high melting point are being handled.

It will also be obvious that the spray system may be eliminated so that substantially all product is condensed as solid.

In the embodiment shown in Fig. 2, the spray unit of Fig. 1 is dispensed with and provision is made for collecting separate fractions of the desired product. Where the spray unit is eliminated as in the apparatus of Fig. 2, the tubes of nests 1 and 2 are made somewhat longer than would be necessary if a spray unit were included.

The apparatus of Fig. 2 is similar to that of Fig. 1, except for the omission of the spray system (22 in Fig. 1) and the construction of the connecting chamber 5' (5 in Fig. 1). It will also be remarked that fins are not shown on the tubes 6' of Fig. 2. Whether fins are present or omitted is entirely optional in the construction of either Fig. 1 or Fig. 2.

In Fig. 2, connecting chamber 5' may comprise wells 40 and 41 located directly beneath tube nests 1' and 2' and connected by a pitched duct 42. Lines 43 and 44 are provided for draining liquid product from wells 40 and 41, respectively. A valve system comprising two three-way valves 45, 46, is provided for keeping the two fractions separate throughout the condensing cycle.

In operation, gases are led through valve 8' into header 3' and flow thence through tubes 6' of nest 1'. These tubes are coated with solid product, e. g. solid maleic anhydride, from a previous pass. For the first few minutes the solid will be melted off the tubes of nest 1' by the hot gases and at the same time liquid product will be condensed from the gas. The mixture will fall into well 40 whence it will be drawn off through line 43, will then flow through valve 45, and line 47 to line 50, whence it is collected as a separate fraction of the entire product.

After the first few minutes of operation, the solid will have been entirely melted from nest 1'. When melting has finished, the liquid falling into well 40 will have been condensed as such directly from the gases and will represent a different fraction of the total product from that previously collected. To gather it as a separate product, valve 45 is turned to send the liquid from line 43 into line 49.

Upon reversal of the flow through the apparatus, valve 46 will be adjusted as shown in Fig. 2 to send the material melted from nest 2' into line 50 where it is collected with the material first drawn from nest 1'. Then, after all solid has been melted from nest 2', valve 46 is turned to send the remaining liquid through line 49 for collection with the product condensed as liquid in nest 1'.

The process and apparatus described provide a means for the continuous condensation of a product under conditions where at least a portion of that product must be condensed as a solid.

It will be observed that although at least a portion of the product is condensed as solid, by using the novel method and apparatus, all the product is obtained from the apparatus as a liquid. There is no need for laborious chipping and scaling of incrustations. Moreover, by the use of a gaseous coolant contacting the conduits bearing the hot gases in a single pass, it is possible to control the condensation surface to prevent condensation of water and thus to avoid the production of corrosive substances, such as phthalic or maleic acid, whose presence would demand heavy and expensive equipment.

In addition, in the novel process and apparatus, every part of the apparatus can be used continuously to cool the gases and/or condense product, either as solid or as liquid. By this means, the size of plant used for a given output is greatly reduced. Moreover, since substantially all cooling is done by gaseous coolants flowing through more or less open banks of tubes, heavy and expensive condenser shells and supporting structures are eliminated.

It will be understood that although the process and apparatus have been described particularly in connection with phthalic and maleic anhydride, they may be used as well to recover other substances.

It will further be understood that although the invention has been described in connection with a particular structure, various modifications and changes are possible within the scope of the invention.

What I claim is:

1. A method for recovering a condensible component selected from the group consisting of phthalic anhydride and maleic anhydride from a hot gaseous mixture, which comprises melting solid component from a first condensing surface coated therewith by moving said hot gaseous mixture past said coated surface, simultaneously cooling said hot gaseous mixture by passing a stream of gaseous coolant in indirect heat exchange relation with said first condensing surface, moving said hot gaseous mixture from said first condensing surface past a second condensing surface and condensing said component as a solid from said mixture on said second condensing surface by passing a second separate stream of the same gaseous coolant in indirect heat exchange relation with said second condensing surface.

2. The method claimed in claim 1 in which a portion of the component in the hot gaseous mixture is condensed as a liquid on the first condensing surface.

3. A method as claimed in claim 2, wherein the portion of said component condensed as a liquid and the portion condensed as a solid are collected separately.

4. A method as claimed in claim 1, wherein after said second condensing surface has become coated with solid component, the direction of flow of said hot gaseous mixture past said condensing surfaces is reversed, and solid component is melted from said second condensing surface and condensed on said first surface.

5. A method as claimed in claim 1, wherein after it has been moved past said first condensing surface and before reaching said second condensing surface, said gaseous mixture is sprayed with cooled liquid product.

6. A method for recovering a condensible component selected from the group consisting of phthalic and maleic anhydrides which comprises moving said mixture through first conduit means coated on the inside with solid component, and thereby melting solid component from the inner walls of said first conduit means; and then moving said mixture through second conduit means, simultaneously moving separate streams of the same gaseous coolant past the outside of each of said conduit means, and thereby cooling the hot gaseous mixture in contact with said first conduit means to above the temperature at which said component condenses as a solid and condensing solid component on the inner walls of said second conduit means.

7. A method as claimed in claim 6, wherein after the inner walls of said second conduit means have been coated with solid component, the direction of flow of said gaseous mixture through said first and second conduit means is reversed, and solid component is melted from said second conduit means and condensed on said first conduit means.

8. A method as claimed in claim 6, wherein after it has been moved through said first conduit means and before reaching said second conduit means, said mixture is sprayed with cooled liquid product.

9. Condensing apparatus comprising a first set of conduits, a second set of conduits, means connecting said first set of conduits with said second set of conduits, means for flowing a hot gas successively through said first set of conduits, said connecting means, and said second set of conduits for cooling said gas, entrainment removal means positioned in said connecting means for removing any condensate formed in said first set of conduits, and duct means arranged adjacent each of said sets of conduit means for flowing separate streams of gaseous coolant transversely across substantially the entire length of each of said sets of conduits, said duct means having a width substantially equal to the length of said conduits.

10. Condensing apparatus comprising a first set of substantially parallel conduits, a second set of substantially parallel conduits, means for moving gaseous heat exchange medium in a single pass through said conduits external to the tubes thereof and in a direction substantially transverse to said conduits, a chamber connecting said first set of conduits with said second set, entrainment removal means in said chambers, and spray means in said chamber for contacting gases passing from one set of conduits to the other.

11. Apparatus as claimed in claim 10, and including cooling means and a conduit leading from the bottom of said chamber through said cooling means to said spray means, whereby liquid collecting in the bottom of said chamber may be cooled and discharged through said spray means.

12. Condensing apparatus comprising a first tube nest, a second tube nest, duct means arranged adjacent said tube nests, and at a point adjacent said tube nests having a width substantially equal to the length of said tube nests, a chamber connecting said first nest with said second nest, entrainment removal means in said chamber, and spray means in said chamber for contacting gases passing from one tube nest to the other.

References Cited in the file of this patent

UNITED STATES PATENTS

| | | |
|---|---|---|
| 1,426,177 | Garner | Aug. 15, 1922 |
| 1,427,159 | MacLeod | Aug. 29, 1922 |
| 1,817,667 | Blau | Aug. 4, 1931 |
| 1,951,185 | De Baufre | Mar. 13, 1934 |
| 2,076,033 | Kniskern | Apr. 6, 1937 |
| 2,252,739 | Stoever | Aug. 19, 1941 |
| 2,360,408 | Dunn et al. | Oct. 17, 1944 |
| 2,455,314 | Pietzsch | Nov. 30, 1948 |
| 2,460,754 | Kidd | Feb. 1, 1949 |
| 2,692,657 | Barton | Oct. 26, 1954 |
| 2,702,091 | Smith | Feb. 15, 1955 |